Jan. 23, 1962 H. G. PACK 3,018,430
THERMOELECTRIC GENERATOR WITH FEEDBACK FOR INCREASING EFFICIENCY
Original Filed March 2, 1959 3 Sheets-Sheet 1
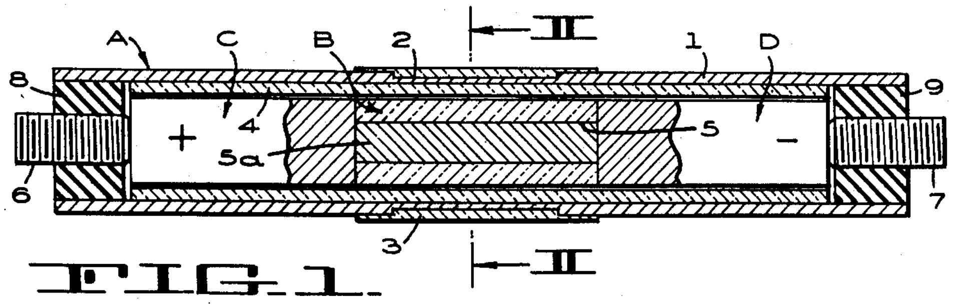
FIG. 1
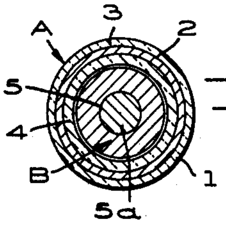
FIG. 2
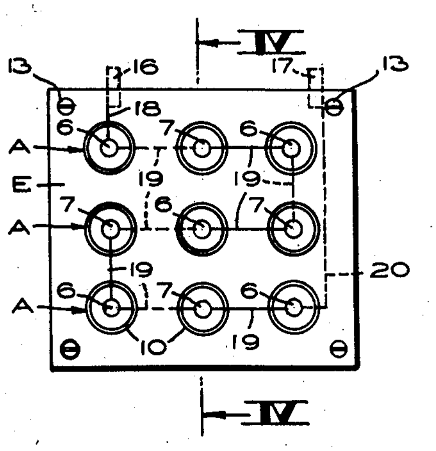
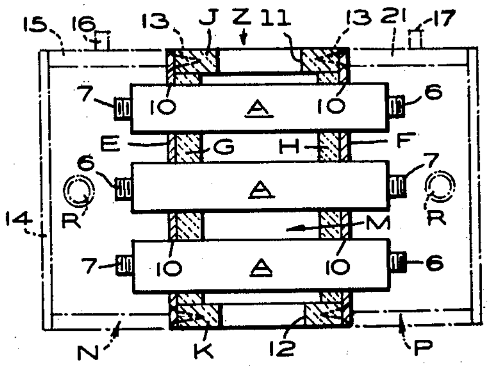
FIG. 3 FIG. 4
INVENTOR
HERSCHEL G. PACK
BY Munn & Liddy
ATTORNEYS INVENTOR.
HERSCHEL G. PACK
BY Munn & Liddy
ATTORNEYS INVENTOR.
HERSCHEL G. PACK
BY
Munn & Liddy
ATTORNEYS United States Patent Office 3,018,430
Patented Jan. 23, 1962

3,018,430

THERMOELECTRIC GENERATOR WITH FEEDBACK FOR INCREASING EFFICIENCY

Herschel G. Pack, 4308 Modoc Road,
Santa Barbara, Calif.

Original application Mar. 2, 1959, Ser. No. 796,403, now Patent No. 2,979,551, dated Apr. 11, 1961. Divided and this application Sept. 3, 1959, Ser. No. 837,905
5 Claims. (Cl. 322—2)

My invention relates to improvements in thermoelectric generators with feedbacks for increasing the efficiency of the generators, and it consists in the combinations, constructions, and arrangements hereinafter described and claimed.

This application is a division of my copending application on a thermoelectric generator, filed March 2, 1959, Serial No. 796,403, now Patent No. 2,979,551. In the pending application I describe and illustrate a novel unit thermocouple and show how a group of them are used in a thermoelectric generator for generating D.C. current when heat is applied to the thermocouple units. It is possible to store the D.C. current produced by the thermoelectric generator and feed it back to the generator intermittently for heating the thermocouples, and at the same time connect the generator to a load for causing the generator to increase its current output above that which it would be capable of performing were there no feedback of current to the generator. The present case is directed primarily at this D.C. current feedback for increasing the efficiency of the thermoelectric generator. Any source of direct current could be used for heating the thermocouples.

I make use of semi-conducting positive and negative elements arranged on opposite sides of a central heat-transferring element in the unit thermocouples, because when these positive and negative elements are subjected to an increase in voltage, their electric resistance is lowered and more current can flow therethrough. Therefore a greater current will flow through the central element for increasing its temperature. It is the temperature gradient across the positive and negative elements that causes them to generate electricity.

Thermoelectric generators in the past have had to choose between voltage (obtained from many small elements in series), or current (obtained from a few large elements). Power is the product of voltage and current. I have shown how to obtain both in one generator.

It is best to describe the construction of the thermocouple units and then describe how they are arranged to form a thermoelectric generator, in order to lay a foundation for describing the feedback of direct current to the thermocouples for heating them, and thus increasing the current output of the generator. The feedback circuit is electrically insulated from the generator circuit.

Other objects and advantages will appear as the specification continues, and the novel features of the feedback circuits in combination with the thermoelectric generators will be set forth in the appended claims.

In the drawings:

For a better understanding of my invention, reference should be had to the accompanying drawings, forming part of this specification, in which FIGURE 1 is a longitudinal section through one of the thermoelectric elements;

FIGURE 2 is a transverse section taken along the line II—II of FIGURE 1;

FIGURE 3 is an end view of FIGURE 4 and shows a number of the thermoelectric elements extending through openings provided in the end pieces;

FIGURE 4 is a section taken along the line IV—IV of FIGURE 3, and shows the thermoelectric elements supported by two end pieces. A heating chamber is formed between the two end pieces and a hot fluid is passed through the chamber for heating the central portions of the thermoelectric elements;

Figure 9:
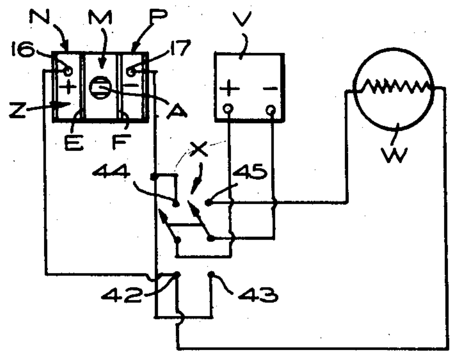
Figure 10:
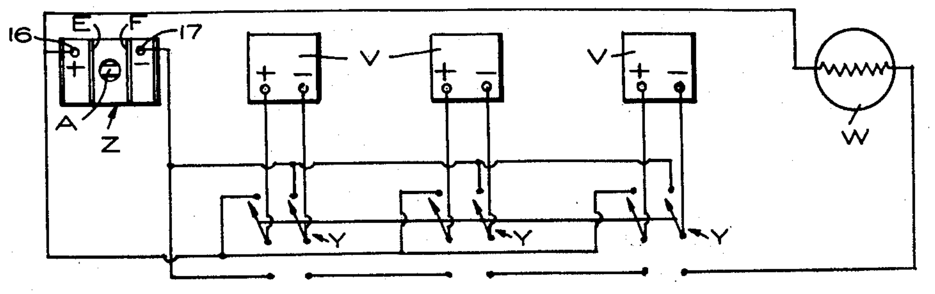

FIGURE 9 illustrates a circuit where the D.C. current output of the thermoelectric generator can be stored and then fed back through the generator when the latter is connected to a load for increasing the efficiency of the generator; and FIGURE 10 illustrates another D.C. feedback circuit from the current storage units to the thermoelectric generator, where a multi-pole double throw switch is used for connecting the storage units in parallel with the generator during the charging of the storage units and where the switch connects the storage units, generator and load in series with the load for increasing the D.C. current flow from the generator to the load.

While I have shown only the preferred forms of my invention, it should be understood that various changes or modifications may be made within the scope of the annexed claims without departing from the spirit thereof.

*Detailed description of the thermocouple unit*

In FIGURE 1, I show a cross section of a unit thermocouple A, which is used in the thermoelectric generator Z, hereinafter described. The thermocouple comprises a thin-walled metal cylinder 1, which may be one and one half inches long and about one fourth inch in diameter. I do not wish to be confined to these measurements, since they are merely given by way of example. The thin metal cylinder is made of a heat resistant metal such as Inconel or better. Tungsten is preferable to use, but it is difficult to fabricate this metal. Between these two extremes of metal, there are numerous other metals or alloys which could be used as the material for the thin-walled cylinder.

The mid portion of the cylinder 1, has an annular groove 2, so as to reduce the cross sectional area at this point. A thin coating 3, of refractory ceramic material, fills the groove 2, and the purpose of the coating is to protect the cylinder 1 from the deteriorating effects of heat. The inner surface of the metal cylinder 1 is lined with a thin layer 4, of ceramic material, for the greater part of the cylinder's length. This inner layer of ceramic affords an electrical insulation for the three elements B, C and D, mounted within the cylinder.

I mount the three rod-like elements B, C, and D, within the ceramic insulating layer 4, so that they are free to slide within the cylinder. The center element B is only for electrically connecting the active or current producing elements C and D, and conveying heat thereto. The center heat-transferring element B may be a solid metal rod or of a special construction to attain certain effects such as a tube of quartz or ceramic with a bore 5, of small diameter in which is placed an electrically conductive material of a higher electrical resistance in reduced cross section than the active elements C and D. Tungsten or tungsten carbide 5*a*, could be placed in the bore 5.

Thermoelectric element materials cover a very wide range from pure metals to semi-conductors and my invention seeks to provide optimum conditions for all types of metals used in forming the active elements C and D, and the center element B. Metallic elements tend to have low electrical resistance and change little with temperature changes. Such metallic elements produce low voltages. An example would be a positive copper current-producing element C and a nickel negative current-producing element D, both being in contact with the center element B.

Semi-conducting elements on the other hand, tend to be of a high resistance normally, and produce a relatively high voltage. Their resistance, however, is much lower when hot and the resistance also decreases under mechanical pressure. Such semi-conducting elements do not follow Ohm's law, that is, their resistance drops with an increase in applied voltage. An example of a semi-conductor thermocouple would be a positive element C of copper sulphide and a negative element D of lead sulphide.

Alloy couples lie between good metal electrical conductors and semi-conducting elements. An example of a negative alloy would be a Monel metal, of copper and nickel and a positive alloy of zinc and antimony. In addition, it is possible to have positve or negative elements C and D, made specifically to produce certain characteristics. This is accomplished by "doping" as in transistor materials and by various processes. "Doping" is a term much used in electronic literature and refers to the process of refining a material to a high purity and then adding minute amounts of a selected impurity to attain desired electrical properties.

One group of thermocouple elements C and D is made of ceramic-like metallic oxides which become conductive at high temperatures. Elements of bismuth telluride are "doped" to produce couples for the "Peltier Effect" which is a process of passing an electric current in the proper direction across a thermoelectric junction and thereby lower the temperature of the junction.

The active elements C and D, are any two electrically conductive dissimilar materials. The elements C and D are held in electrical contact with the center element B, by adjustable screws 6 and 7, mounted in silicone rubber end plugs 8 and 9, respectively. The three elements B, C and D, are sealed in the cylinder 1, at all times to prevent oxidation, and are under pressure to insure good electrical connection.

If heat were applied to the ceramic layer 3, at the center of the cylinder, the resulting expansion would quickly loosen contact between the three elements B, C and D, creating high resistance and probably destroying contact altogether. The silicone rubber end plugs 8 and 9 could not stand the heat and would have to be cooled in some way. In all instances it is desirable to effect good electrical contacts and protect the elements B, C and D, from the damaging effects of heat and air.

*Detailed description of the thermoelectric generator*

In FIGURES 3 to 6 inclusive, I show a thermoelectric generator Z. In the thermoelectric generator, I can use from one to an infinite number of unit thermocouples A. A generator would probably have one hundred such unit thermocouples. For purpose of illustration, I have shown only nine unit thermocouples A, in the generator Z, of FIGURES 3 to 6 inclusive. I use two stainless steel end pieces E and F and drill nine holes 10 in each. I place the nine cylinders 1, of the unit thermocouples A, in the nine aligned holes in the end pieces E, and F, and braze or otherwise secure the cylinders in place so that their ends will project beyond the end pieces as clearly shown in FIGURE 4. This provides a rigid metal structure.

I now place a layer of heat-resistant material on the inside wall of each end piece E and F. In FIGURE 4, these two layers are shown at G and H. I then provide top and bottom ceramic pieces J and K, that extend between the two end pieces E and F, and I also provide side ceramic pieces L. All of these pieces provide a heating chamber M, that lies between the end pieces E and F. It is necessary to circulate hot fluid around the centers of the unit thermocouples A, so I provide the top piece J with an outlet opening 11, and the bottom piece K with an inlet opening 12. Screws 13, or other suitable fastening means may be used for securing the end pieces E and F, to the top and bottom ceramic pieces J and K. The screws should not extend between the end pieces E and F.

Figure 5:
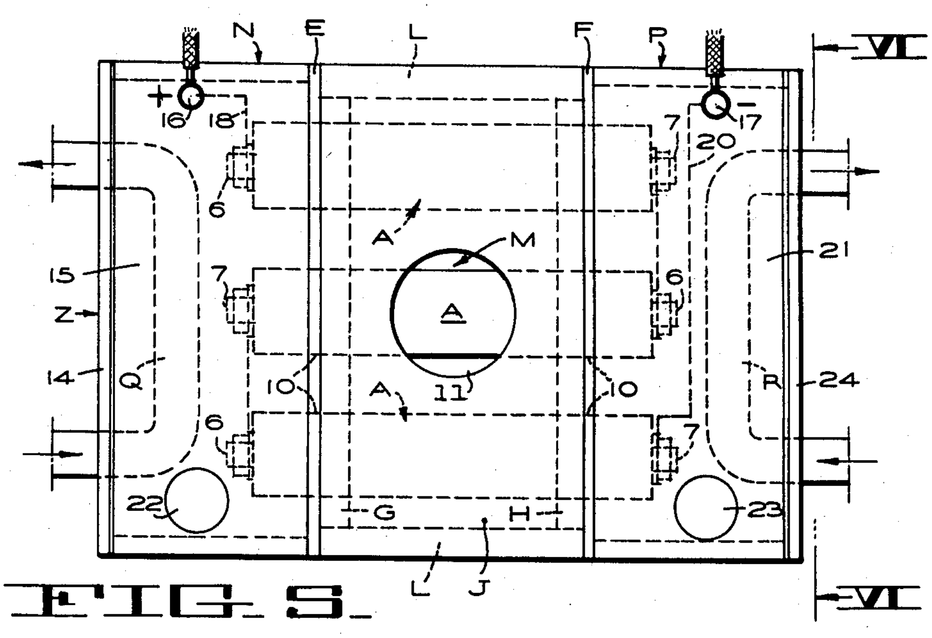
FIGURE 5 is a top view of FIGURE 4 and illustrates a cooling tank connected to each end piece and enclosing the projecting ends of the thermoelectric elements.

It is further necessary to provide two cooling tanks to enclose the ends of the cylinders 1, projecting from the end pieces E and F. In FIGURE 5, I show two cooling tanks N and P, one tank being placed at each end of the heating chamber M. The cooling tank N, consists of four walls forming a rectangle and the edges of the walls are attached to the end piece E, so as to make a liquid-tight fit therewith. A cover plate 14, is secured to the other or exposed edges of the four walls by screws and a liquid-tight compartment is formed. The top wall 15, for the cooling tank N, has an electrode 16, extending therethrough and this electrode is insulated from the top wall. A wire 18, leads from the inner end of the electrode 16, to the screw 6, of one of the unit thermocouples A. The nine thermocouples A, are connected in series in FIGURE 3, and adjacent thermocouples are reversed in their positions so that only short wires 19, need be used to connect them in series with each other. The screw 7, of the last thermocouple A, is then connected by a wire 20, to another electrode 17, which is mounted in and insulated from the top 21, for the cooling tank P. If the thermocouples A, are connected in parallel, instead of series, all of the screws 6, of the thermocouples would be arranged in one cooling tank N, and all of the screws 7, of the same thermocouples would be arranged in the other cooling tank P. All of the screws 6, would be connected to each other and to the terminal 16, while all of the screws 7, would be connected to each other and to the terminal 17.

The metal end pieces E and F, are thicker than the walls of the metal cylinders 1. The tanks N and P, have pressure filler caps 22 and 23, in their tops and these caps are removed when the tanks are filled with fluid. The ends of the metal cylinders 1, project into the fluid. The openings 11 and 12, for the heating chamber M, are for the intake and exhaust of the heating fluid. The fluid would normally be combustion gases from burning fuel, but could be engine exhaust gases, heated air or a hot liquid. The heated fluid would enter the chamber M, by the inlet 12, and would leave the chamber by the outlet 11.

Figure 6:
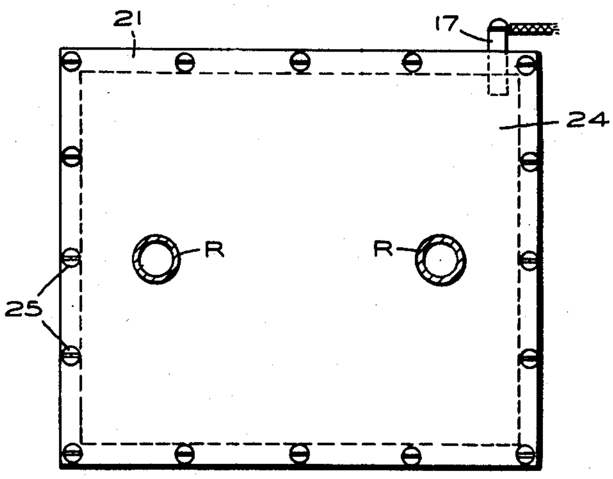
FIGURE 6 is an end view of FIGURE 5 when looking in the direction of the arrows VI—VI of FIGURE 5.

The cooling tank P, is closed by a cover plate 24, and FIGURE 6 shows the plate secured in place by screws 25. The two cooling tanks N and P, have metal tubes Q and R, in them, respectively, through which water or other cooling fluid is circulated to remove heat from the cooling fluid in the tanks. The water flowing through the tubes Z and R, would be heated by the fluid in the tanks N and P, and this heated water could be used elsewhere. The fluid in the tanks N and P, would be a non-conductor of electricity such as silicone. The tanks N and P, are preferably made of stainless steel and may be heat insulated in the same manner as boilers or hot water tanks are insulated. Gaskets may be placed under the cover plates 14 and 24, to insure a fluid tight seal.

The ends of the unit thermocouples A, that extend into the tanks N and P, are cooled by the fluid in these tanks and the ends will also be under hydrostatic pressure from the pressure of the silicone fluid in the tanks. Heat is transferred from the cylinders 1, to the active elements C and D, by the central heat transfer element B, and in addition, any electric current flowing through the active elements C and D, will generate heat in the heat transfer element B, where it will assist in thermoelectric generation of a current. The heat applied to the central area of the cylinders 1, by the hot fluid flowing through the heating chamber M, will be quickly conducted through the thin cylindrical wall to the center heat transfer element B, which acts as a heat reservoir to accumulate heat and to heat the inner ends of the generating elements C and D. The elements C and D, in general, are relatively poor heat conductors. The thin cylinder walls of the unit thermocouples A, likewise offer a poor heat conductive path outward; hence the temperature tends to build up in the center section. The heat which does flow into the electrical generating elements C and D, in most cases, tends to lower their electrical resistance, a desirable feature as long as one end is at a much higher temperature than the other. How the special heat transfer element B, would likewise perform is evident and additional heat would be internally generated. This would, of course, be at the expense of adding some extra resistance to the generator.

As already stated, the bore 5, of the center element B, is preferably filled with tungsten or tungsten carbide. Neither material has a higher specific resistance than the average thermoelectric element material, but due to the greatly reduced cross section of either of these two elements in the bore 5, of the quartz tube B, the resistance of this center element is greater than that of either the positive element C, or the negative thermoelectric element D. This is comparable to an ordinary electric lamp bulb where the small diameter tungsten filament heats to white heat while the supporting wires remain cool when current flows through the circuit. Therefore, the high resistance tungsten $5^a$ will be heated.

The silicon rubber end plugs 8 and 9, are fluid cooled by the fluid in the tanks N and P. The same fluid exerts an elastic pressure against the plugs to in turn cause the inner ends of the screws 6 and 7, to maintain good electrical contact between the elements C, D and B, in the cylinders 1. The screws 6 and 7, are for attaining initial contact and for readjustment if required. The same hydraulic pressure on all of the cylinder ends by the silicone fluid in the cooling tanks, ensures uniform pressure and therefore good electrical contacts among the elements B, C and D, in each cylinder 1, at all times. The unit thermocouples A, are connected to each other in series to attain a higher voltage or they are connected in parallel to attain a higher current.

The use of a high resistant material $5^a$ of a reduced cross section because of the bore 5, provides a good heat transfer unit B. I have shown an arbitrary number of unit thermocouples A, and an arbitrary size of heating chamber M, in order to give one illustration of the thermoelectric generator. An actual model would probably have one hundred unit thermocouples arranged in ten rows with ten units being in each row. It is desirable to have the heating chamber as narrow as practicable in order to limit the heating to the center portion of the unit thermocouple A. The metal tubes Q and R, for cooling the silicone fluid in the cooling tanks N and P, would be bent to expose more area of the tube walls to the fluid. The generator Z will be surrounded by heat insulating material.

*Use of A.C. current for heating thermoelectric generator*

Figure 7:
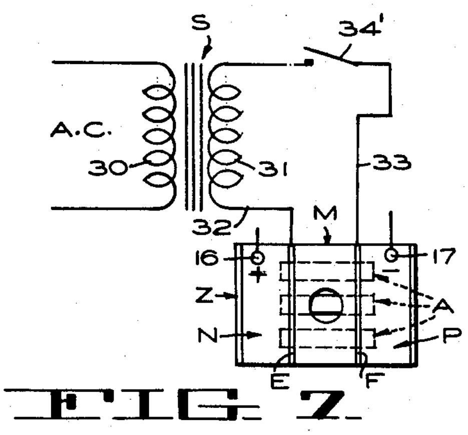
FIGURE 7 illustrates an A.C. electric circuit for heating the thermocouples in the thermoelectric generator rather than using a heating fluid.

Referring to FIGURE 7, I have shown how my thermoelectric generator can have its unit thermocouples A, heated by an alternating electric current instead of by a heated fluid flowing through the heating chamber M. A step down transformer S, has its primary coil 30, connected to a source of alternating electric current and has its secondary coil 31, connected to the metal end pieces E and F, of the generator by wires 32 and 33. A switch 34' is placed in the secondary circuit for connecting the metal end pieces to the alternating current. The unit thermocouples A, have their metal cylinders 1, brazed to the metal end pieces E and F, and therefore all of the metal cylinders will be connected in electrical parallel with the secondary circuit flowing through the wires 32 and 33. The unit thermocouples will have their central portions heated by offering resistance to the alternating current and the thermocouples A, will deliver a direct current to the terminals 16 and 17, because the thermocouples are electrically connected to the terminals. The step down transformer S, is preferably of the type used in spot welding. The electrical heating of the centers of the unit thermocouples is enhanced because the metal cylinders 1, are reduced in cross sectional area by the annular grooves 2. The arrangement shown in FIGURE 7 can use a source of alternating current to produce heat in the unit thermocouples A, and these in turn will generate a direct current.

Figure 8:
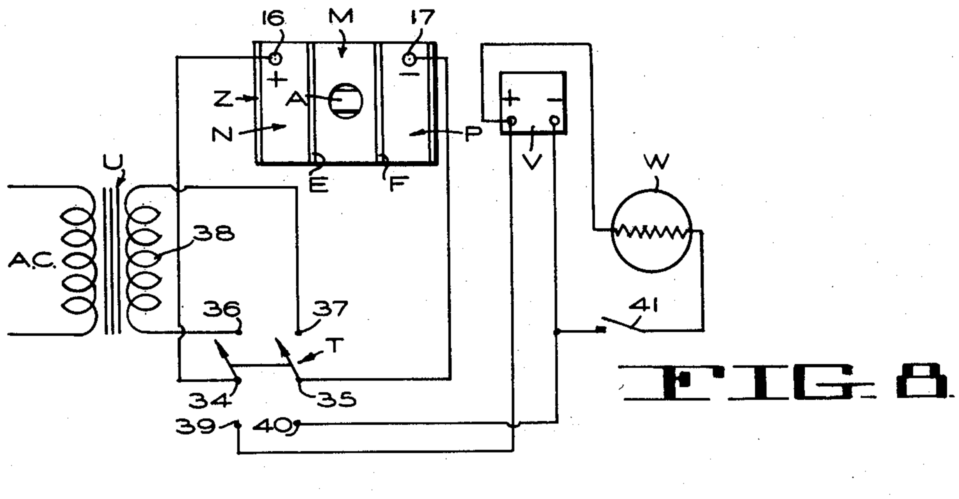
FIGURE 8 shows another A.C. electric circuit for heating the thermocouples in the thermoelectric generator when a switch closes the circuit, the same switch being used for opening the circuit when the thermocouples are heated, and closing a second circuit connecting the D.C. current output of the generator with an electric current storage unit and with a load.

Another method of using external voltage to heat the thermocouples A, and produce a direct current is shown in FIGURE 8. Assume that all of the unit thermocouples A, are loaded with generating elements C and D, separated by the special heat conducting center element B, and that the output terminals 16 and 17, of the generator are connected to the center terminals 34 and 35, of a double pole double throw switch T. Now, when the switch T, is thrown to close the terminals 36 and 37, the terminals 16 and 17, are connected to the secondary 38, of a transformer U, and current flowing in the secondary circuit will generate heat, mostly in the heat transfer elements B, because they are of a higher resistance than the elements C and D. The terminals 16 and 17, could be connected to direct current if desired. The heat will be stored in the transfer elements B.

Now when the switch T is thrown to the other position and connects with terminals 39 and 40, thermoelectric generation from the stored heat in the transfer elements B, will flow into the external circuit that leads to a storage battery V, or a work load W. A switch 41 is used for connecting the work load to the storage battery. The work load W can be connected directly to the terminals 39 and 40 without the switch 41 if desired. It is thus seen that by alternately throwing the switch T from one position to the other, a voltage is produced and an external current will flow. It will of course be obvious that electric heating of the unit thermocouples can be used in conjunction with other heating such as gases of combustion flowing through the heating chamber M.

*Feedback of output current of generator to increase efficiency*

Consideration will now be given to means of feeding the output of the thermoelectric generator back through the generator to increase its efficiency. In FIGURE 9, when the double pole double throw switch X, connects with the terminals 42 and 43, the output of the generator Z, will flow into the storage units which may be the storage battery V, or a capacitor, not shown. When the switch X is thrown to the other position and connects with terminals 44 and 45, the storage unit V will be in series with the thermoelectric generator and will discharge through the generator into the load W.

The storage unit V, and the thermoelectric generator Z of FIGURE 9, are in series with each other and with the load W, when the switch X, is swung to connect with the terminals 42 and 43. The thermocouples A, in the generator Z, have positive and negative non-linear resistance elements C and D, therein. The voltage of the current from the storage unit V, in passing through these elements, decreases their resistance and therefore a greater current will flow through the elements to heat the center element B, still more. In this way the increased heat of the center element B, will produce a greater temperature gradient across the elements C and D, and generate a greater D.C. current to feed to the load.

The generator Z, in FIGURE 9, can be heated by hot fluid in the heating chamber M, in addition to the D.C. current from the storage unit V, flowing to the generator for heating the central element B, when the switch X, contacts the terminals 42 and 43. The extra current resulting from the increased heating of the central element B, would add to the total. This is clearly a power gain.

I have shown in FIGURE 9, a storage unit, such as a battery V, as a part of the thermoelectric generator, to improve its efficiency by temporarily storing energy between power pulses. A "power pulse" is when the switch X, connects the generator Z, to the load W. "Between power pulses" is when the switch X, connects the storage unit V, with the generator Z, so that the generator can store electrical energy in the unit V. My end objectives are increased generator efficiency and output. A capacitor, not shown, could be used as a storage unit rather than the battery V. The switch X, can be manually swung between its two positions or it could be mechanically moved.

My generator Z, is analogous to an internal combustion engine. In the engine, a small "investment" of energy is made to compress air in the combustion chamber during the compression stroke. This is a temporary use of energy which is multiplied in increased power output. In my generator, energy is compressed into the capacitors (storage battery V) for temporary storage, and is then fed back through the thermoelectric circuit to increase its efficiency and output. My invention is not a means of charging either batteries V or capacitors as an end objective, but to feed back current from the storage unit to the generator Z, during the "power pulse" for increasing the current output of the generator when it is connected to the load W.

In FIGURE 10, I show a multi-pole double throw switch Y, for connecting a plurality of storage units, such as the storage batteries V, with the thermoelectric generator Z, so that the batteries will be charged in parallel. A throwing of the switch Y, into its other position will connect the storage batteries in series with each other and in series with the work load W. The batteries V, will therefore be charged in parallel and discharged in series.

I have shown how electric current fed back through the thermoelectric generator Z, can be used to produce heat to increase the output of the generator. Another advantage of the feedback of electricity to the generator results in the non-linear resistance of many thermoelectric element materials to the electric current. This means that the resistance of the elements C and D, drops in proportion to the applied voltage. Therefore it is obviously advantageous to discharge the storage devices V, in series through the generator Z. This is an advantage in addition to the general advantages of attaining as high an operating voltage as possible.

It will be seen that the only moving mechanical part in the generator Z, and the associate electric circuit in FIGURE 10, is the multi-pole double throw switch Y. The switch Y, may be motor driven, which is preferable or be in the form of a relay. Little power is required to operate such a switch Y, and timing and cycling can be adjusted to conditions optimum for the particular operation.

In the structure of the thermoelectric generator Z, shown in FIGURE 5, the thermoelectric elements B, C and D, are connected in electrical series and are at all times electrically insulated from the metal cylinders 1, by the insulating sleeves 4, and therefore are insulated from all metal parts of the generator. The series circuit in each unit thermocouple A, and the connecting of the thermocouples in series can be referred to as the thermoelectric circuit. The silicone fluid in the cooling tanks N and P, is of course an electrical insulator and therefore the wires connecting the thermocouples will not be short circuited.

The parallel circuits mentioned in FIGURES 7 and 8, is a heating circuit and is a means of applying heat to the central portions of the metal cylinders 1. The principle of using electricity for heating the metal cylinders 1, makes use of the cylinders themselves as resistance elements and therefore the cylinders will be heated. The resistance of a group of metal cylinders 1, in parallel would be very low, but a heavy current at very low voltage would heat them very well. Such electric heating is obtainable from alternating current from a transformer. Since the centers of the metal cylinders 1, are thinner, the resistance will be greater and the heat will tend to localize in these portions. By this means I can use alternating current to produce heat in the generator Z, and the generator in turn will produce direct current electricity by thermoelectric action. Both the input electric circuit into the generator Z, and the output direct current circuit can and do function simultaneously.

A short round rod of copper or other metal can be used for the heat transfer element B. The special heat transfer element of quartz having the bore 5, filled with tungsten 5$^a$ is for the purpose of generating internal heat when an electric current flows through the tungsten. There are thousands of materials which will yield a thermoelectric voltage when the materials are heated. Optimum operating conditions vary with the change of the elements B, C and D, and hence many variations of elements may be used in the generator Z. For some applications silicon is a cheaper and more desirable material than tungsten or tungsten carbide.

I claim:

1. In combination: a thermoelectric generator having at least one thermocouple in which a heat transfer element is positioned between and contacted by a positive current-producing element and a negative current-producing element; the positive and negative elements being formed of materials that offer a resistance to a current flowing through the three elements; the materials having the characteristic that as the voltage is increased the resistance of the positive and negative elements is lowered and therefore a greater amount of current will flow through the elements and the heat transfer element for increasing the temperature of the latter; said positive and negative elements generating a greater current when there is a greater temperature gradient across them; current storing means; a double throw switch and circuit for connecting the three elements in series with the current storing means for causing the current output of the elements to be stored in the current storing means when the switch is in one position; and a second circuit placing the three elements in series with the current storing means and with a work load when the switch is moved into its other position so that the current storing means will discharge through the three elements and increase the temperature of the heat transfer element and cause the positive and negative elements to generate a greater amount of current that will flow to the load.

2. The combination with a thermoelectric generator having a pair of electrodes; current storing means; a double throw switch and circuit for connecting the electrodes to the current storing means for causing the current output of the generator to be stored in the current storing means when the switch is in one position; and a second circuit placing the elements of the generator in series with the current storing means and with a work load when the switch is moved into its other position, so that the current storing means will discharge through the generator and into the work load.

3. In combination: a thermoelectric generator having at least one thermocouple with a heat transfer element and a positive and a negative current producing elements of non-linear resistance material placed on each side of the heat transfer element; a load; and means for causing direct current to flow through all three elements and the load in series so that the voltage will lower the resistance of the positive and negative elements and permit more current to pass therethrough and through the heat transfer element for raising the temperature of the latter and cause a greater temperature gradient across the positive and negative elements for generating a greater amount of current that will flow through the load.

4. The combination with a thermoelectric generator having a pair of electrodes; a plurality of current storage units; a multi-pole double throw switch; an electric circuit placing the current storage units in parallel with the generator when the switch is in one position; and a second circuit placing the current storage units in series with each other and in series with a work load so that an electric current will flow from the current storage units to the work load when the switch is moved into its other position.

5. In combination: a thermoelectric generator having at least one thermocouple with a heat transfer element and a positive and a negative current producing elements of non-linear resistance material placed on each side of the heat transfer element; a load; and means for causing direct current to flow through all three elements and the load in series so that the voltage will lower the resistance of the positive and negative elements.

References Cited in the file of this patent

UNITED STATES PATENTS

| | | |
|---|---|---|
| 472,193 | Marshall | Apr. 5, 1892 |
| 2,443,641 | Ray | June 22, 1948 |
| 2,635,431 | Bichowsky | Apr. 21, 1953 |
| 2,753,522 | Marsden | July 3, 1956 |
| 2,847,643 | De Boisblanc | Aug. 12, 1958 |